Figure 1:
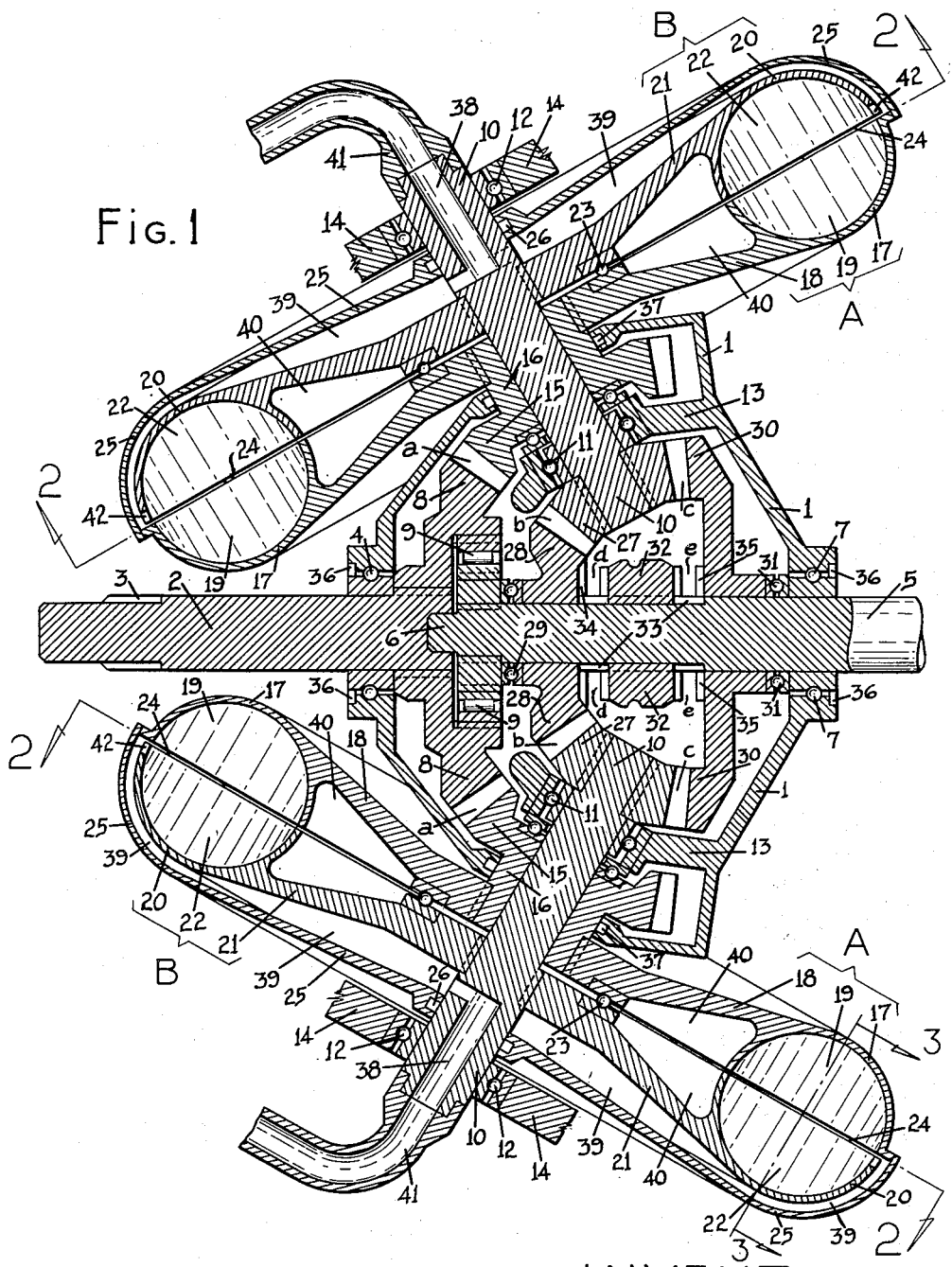

Feb. 17, 1953     B. J. PIQUÉ     2,628,509
HYDRODYNAMIC TRANSMISSION

Filed Oct. 21, 1950     2 SHEETS—SHEET 1

INVENTOR

Feb. 17, 1953     B. J. PIQUÉ     2,628,509
HYDRODYNAMIC TRANSMISSION
Filed Oct. 21, 1950     2 SHEETS—SHEET 2
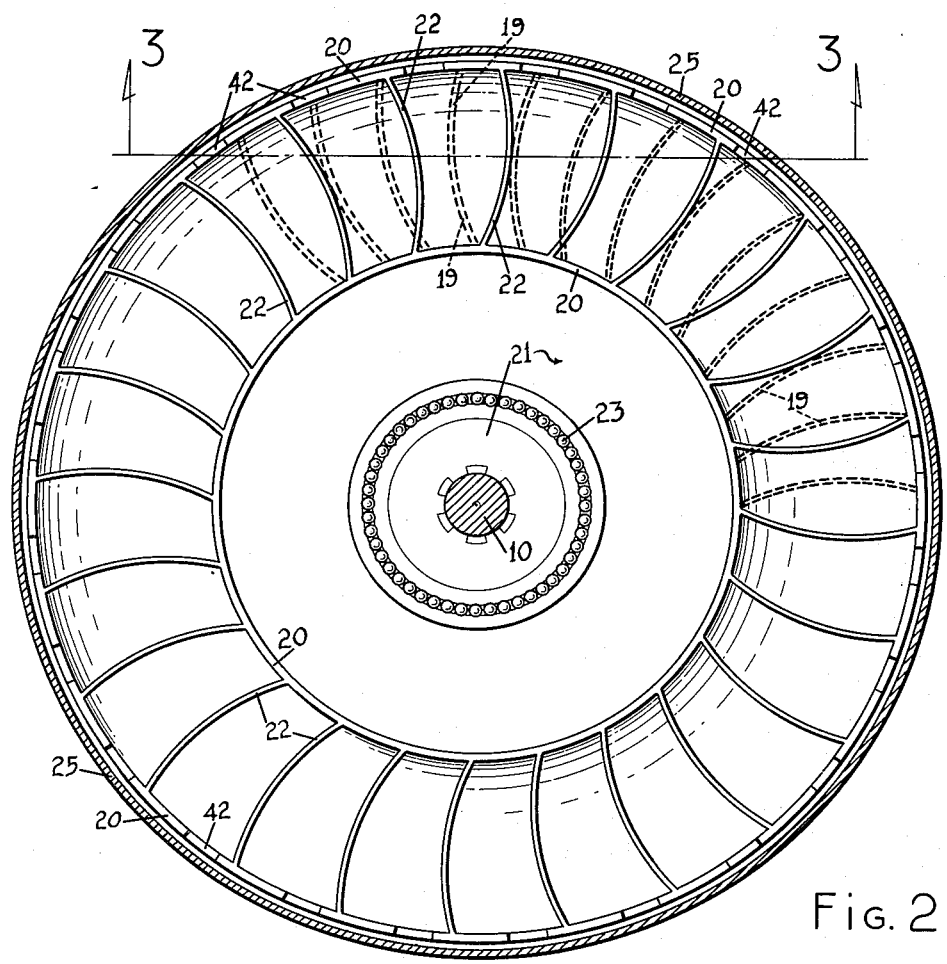
Fig. 2
Fig. 3
INVENTOR
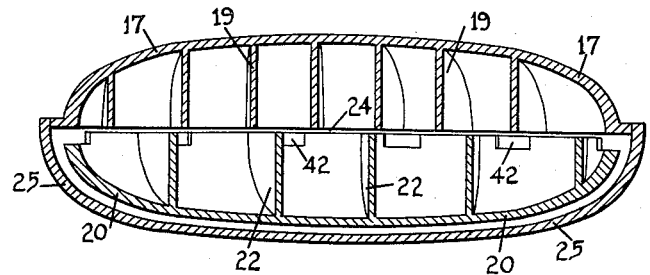

Patented Feb. 17, 1953

2,628,509

UNITED STATES PATENT OFFICE 2,628,509

HYDRODYNAMIC TRANSMISSION

Baudilio Jesús Piqué, Marianao, Habana, Cuba

Application October 21, 1950, Serial No. 191,431

5 Claims. (Cl. 74—730)

My invention relates to a hydrodynamic transmission which produces a variable speed ratio in an automobile, truck, tractor or any machine. It has been designed more particularly as a hydromechanic gearing transmission in which hydraulic power balances the engine power with the resistant power.

One of the advantages of this hydrotransmission is to obtain a high dynamic action with a simplified mechanism. And thus, moreover, I combine this hydrodynamic transmission with the fluid coupling claimed in my co-pending application Serial No. 266,831, filed January 16, 1952, and with the sealed fluid clutch claimed in my co-pending application Serial No. 316,629, filed October 24, 1952.

The objects of my invention are: first, to provide means to combine a hydraulic coupler with an auxiliary shaft being both in bevel gear relation respectively with a driving shaft and a driven shaft transmitting between them direct and reverse variable speed ratios; second, into afford means to convert the total engine power to hydraulic power; third, to provide means to increase the available hydraulic power in a hydraulic coupler; fourth, to afford means to transmit an increased torque decreasing it from start to high speed of the driven shaft; fifth, to provide means to inject cooled liquid into a hydraulic coupler and exhaust the liquid alternatively; sixth, to afford means to transmit simultaneously twofold hydraulic power action.

Other objects and advantages will be understood from the following description:

It is known that the hydraulic power produced in a pump rotor member is directly proportional to the diameter, capacity and square of the angular velocity of said pump rotor member; and the available hydraulic power in the turbine rotor member is directly proportional to the relative speed or difference of speed between the pump rotor member and turbine rotor member, and to the area of vanes normal to the hydraulic jet.

Based on these hydrochmechanic principles, I have attained the objects of my invention by means of the mechanism, shape, arrangement and combination of parts with reference to the accompanying drawings, in which: Fig. 1 is a longitudinal sectional view through my hydrodynamic transmission; Fig. 2 is a cross-section view on the line 2—2 of Fig. 1, showing parts of the anterior view to the section 2—2; and Fig. 3 is a detailed sectional view on the line 3—3 of Figs. 1 and 2.

Similar numerals and letters refer to the same or similar parts throughout the figures.

Referring to the drawings, numeral 1 is used to designate a gearing case which is sealed and adapted to support the gearing.

Numeral 2 is a driving shaft provided with splines 3 to be coupled to the motor shaft not shown in the drawings. Said driving shaft 2 is sustained through bearing 4 by the support of the gearing case 1.

A driven shaft 5, being in alignment with said driving shaft 2, is sustained freely by the end pin 6 and through bearing 7 by the support of the gearing case 1.

A bevel gear 8 being attached through its hub at the end of driving shaft 2.

A conventional one-way clutch 9 connects the driven shaft 5 to the driving shaft 2 through the web of bevel gear 8. This one-way clutch 9 is adapted to fasten the driven shaft 5 at the driving shaft 2 when said driven shaft 5 may have a tendency to rotate more swiftly than said driving shaft 2.

Auxiliary shafts 10 are positioned radially and form a determined angle of incidence with said driving and driven shafts 2 and 5, and are sustained freely through bearings 11 and 12 by the supports 13 and 14.

A bevel gear 15 having attached thereto a hub 16 is sustained freely upon the auxiliary shaft 10. Said bevel gear 15 is engaged at gearing point $a$ with the bevel gear 8 of the driving shaft 2.

Hydraulic couplers A—B, having a pump rotor member A and a turbine rotor member B, are mounted upon the auxiliary shafts 10.

The pump rotor member A is constituted by a toric shell 17 fastened through its web 18 at the hub 16 of the bevel gear 15.

The turbine rotor member B is constituted by a toric shell 20 fastened through its web 21 at the auxiliary shaft 10.

A bearing 23 is located between the pump web 18 and the turbine web 21, to support a hydraulic joint plane 24 of thin thickness between the pump and turbine rotor members A and B.

A series of cylindrical blades 19 are attached in the pump toric shell 17, said cylindrical blades 19 being positioned radially and having their interior cylindrical curvature in the same sense as the direction of rotation and their generatrix lines being normal to the hydraulic joint plane 24.

A series of cylindrical vanes 22 are attached in the turbine toric shell 20. Said cylindrical vanes 22 being positioned radially and having their interior cylindrical curvature in the inverse sense to the direction of rotation and its generatrix lines being normal to the hydraulic joint plane 24.

A cover plate 25, fastened at the periphery of the pump toric shell 17, closes the hydraulic coupler A—B which is sealed by a fluid retainer 26 over the auxiliary shaft 10.

A bevel pinion 27 is fastened at the interior end of the auxiliary shafts 10.

A direct driven bevel gear 28, independently rotatable upon the driven shaft 5, is kept meshed at gearing points b with the bevel pinions 27 by action of bearing 29.

A reverse driven bevel gear 30, independently rotatable upon the driven shaft 5, is kept meshed at gearing points c with the bevel pinions 27 by action of bearing 31.

A toothed clutch 32 is mounted upon the driven shaft 5, which can slide in splines 33 attached on said driven shaft 5.

A series of radial teeth 34 are attached at the web of direct bevel gear 28, to be meshed with the toothed clutch 32 to connect said direct bevel gear 28 with the driven shaft 5.

Another series of radial teeth 35 are attached at the web of reverse bevel gear 30, to be meshed with the toothed clutch 32 to connect said reverse bevel gear 30 with the driven shaft 5.

The gearing case 1 is sealed with fluid retainers 36 and 37.

Central conduits 38 are located at the exterior end of the auxiliary shafts 10, communicating with a chamber 39, located between the cover plate 25 and the turbine rotor member B.

An air chamber 40 is located between the pump web 18 and the turbine web 21.

A coupler liquid fills the chamber 39, and substantially filling the pump and turbine shells 17 and 20.

A feeder and exhauster conduit 41 is fitted at the exterior end of the auxiliary shaft 10 and communicates with the central conduit 38.

A series of openings 42 at the periphery of the turbine shell 20, pass the coupler liquid contained in chamber 39 to toric shells 17 and 20.

The feeder and exhauster conduits 41 communicate with a pump not shown in the drawings, to inject cooled liquid and exhaust the coupler liquid alternatively in the pump and turbine rotor members A and B.

When this hydrodynamic transmission is made with double unit of hydraulic transmission, as is shown in Fig. 1, the two auxiliary shafts 10—10 will be positioned with their axes forming equal angles of incidence with respect to the axes of driving and driven shafts 2 and 5, and intersecting at one point.

Functioning

When the driving shaft 2 together with the bevel gear 8 are rotating, the movement will be transmitted through the gearing point a to the bevel gear 15 together with the pump rotor member A. The bevel gear 8 being of greater pitch diameter than the bevel gear 15, the pump rotor member A will rotate more swiftly than the driving shaft 2.

The hydraulic jet produced from the pump rotor member A will turn the turbine rotor member B together with the auxiliary shaft 10 with a torque increased by a hydraulic lever.

The cylindrical shape of blades 19 adjust the hydraulic jet, and the cylindrical shape of vanes 22 increase the available hydraulic power at the turbine rotor member B.

By means of the conduits 41 and 38 cooled liquid is injected through the chamber 39 and opening 42 to the shells 17 and 20, and the coupler liquid exhausted alternatively, avoiding high temperature produced by the hydraulic jet. By such means each hydraulic coupler A—B is filled and exhausted and its transmission action is cut in and out respectively.

The bevel pinion 27, fastened at the auxiliary shaft 10, rotates the driven bevel gears 28 and 30 in different directions. The direct driven bevel gear 28 rotates independently upon the driven shaft 5 and in the same sense as the driving shaft 2. The reverse driven bevel gear 30 rotates independently upon the driven shaft 5 and inversely to the driving shaft 2.

When the clutch 32 is moved to engage at d with the radial teeth 34 attached to the direct bevel gear 28, the movement is transmitted to the driven shaft 5 in the same sense as the driving shaft 2. And when the clutch 32 is moved to engage at e with the radial teeth 35 attached to the reverse bevel gear 30, the movement is transmitted to the driven shaft 5 inversely of the driving shaft 2.

The pitch diameter of bevel pinion 27 is less than that of the bevel gears 28 and 30. Hence, the torque transmitted from the auxiliary shaft 10 to the driven shaft 5 will be increased at gearing points b or c.

The pitch diameter of reverse bevel gear 30 is higher than that of the direct bevel gear 28. Thus, the increased torque at the reverse gearing point c will be higher than at the direct gearing point b.

In this hydrodynamic system the torque transmitted from the driving shaft 2 is decreased at gearing point a in the relation of pitch diameters of bevel gears 8 and 15, but then, this torque is increased as hydraulic power in the relation of the square of angular velocity of the pump rotor member A; while the available hydraulic torque at the turbine rotor member B is directly proportional to the difference of speed between the pump rotor member A and the turbine rotor member B.

At the start of the driven shaft 5, the available hydraulic torque at the turbine rotor member B is highest and this torque is furthermore increased at gearing point b or c. This torque will be balanced by difference of speed between the pump rotor A and the turbine rotor B, due to increases in the velocity of driven shaft 5 relative to the velocity of the driving shaft 2.

When the driven shaft 5 turns with the same velocity as the driving shaft 2, as in direct speed, the rotor members A and B will turn with the same velocity with each other.

When the relation of pitch diameters of the bevel gear 28 and bevel pinion 27 is higher than the relation of pitch diameters of the bevel gears 8 and 15, the speed transmitted to the driven shaft 5 will be lowest but the torque transmitted will be highest. And, when the first relation of pitch diameters is made lower than the second relation mentioned the torque transmitted to the driven shaft 5 will be lowest but will be attained as an over speed transmission. Under this condition, the one-way clutch 9 will be omitted to permit the driven shaft 5 to rotate more swiftly than the driving shaft 2.

I claim:

1. A hydrodynamic transmission comprising a driving shaft, a driven shaft being in alignment with said driving shaft, an auxiliary shaft positioned radially and forming a determined angle of incidence with said driving and driven shafts, direct and reverse driven bevel gears independently rotatable upon said driven shaft and both being in geared relation respectively with said auxiliary shaft, means to connect and disconnect selectively each one of said driven bevel gears with said driven shaft, a hydraulic coupler having a pump rotor member and a turbine rotor member both being mounted upon said auxiliary shaft, said pump rotor member being independently rotatable with respect to said auxiliary shaft, bevel gears connecting said pump rotor with said driving shaft, and said turbine rotor member being fastened on said auxiliary shaft.

2. A hydrodynamic transmission comprising a driving shaft, a driven shaft being in alignment with said driving shaft, an auxiliary shaft positioned radially and forming a determined angle of incidence with said driving and driven shafts, direct and reverse driven bevel gears independently rotatable upon said driven shaft and both being in geared relation respectively with said auxiliary shaft, means to connect and disconnect selectively each one of said driven bevel gears with said driven shaft, a hydraulic pump rotor member being mounted independently rotatable upon said auxiliary shaft, bevel gears connecting said pump rotor with said driving shaft, a hydraulic turbine rotor member being fastened on said auxiliary shaft, a coupler liquid substantially filling said pump and turbine rotor members, a series of cylindrical blades attached radially in said pump rotor member and having its interior cylindrical curvature in the same sense as the direction of rotation and its generatrix line being normal to the hydraulic joint plane between both pump and turbine rotor members, and a series of cylindrical vanes attached radially in said turbine rotor member and having its interior cylindrical curvature in the inverse sense to the direction of rotation and its generatrix line being normal to the hydraulic joint plane between both pump and turbine rotor members.

3. A hydrodynamic transmission comprising a driving shaft, a driven shaft being in alignment with said driving shaft, an auxiliary shaft positioned radially and forming a determined angle of incidence with said driving and driven shafts, direct and reverse driven bevel gears independently rotatable upon said driven shaft and both being in geared relation respectively with said auxiliary shaft, means to connect and disconnect selectively each one of said driven bevel gears with said driven shaft, a hydraulic coupler having a pump rotor member and a turbine rotor member both being mounted upon said auxiliary shaft, said pump rotor member being independently rotatable with respect to said auxiliary shaft, bevel gears connecting said pump rotor with said driving shaft, said turbine rotor member being fastened on said auxiliary shaft, a coupler liquid substantially filling said pump and turbine rotor members, and means to exhaust the coupler liquid and inject cooled liquid alternatively in said pump and turbine rotor members.

4. A hydrodynamic transmission comprising a driving shaft, a driven shaft being in alignment with said driving shaft, auxiliary shafts positioned radially and forming respectively equal determined angle of incidence with said driving and driven shafts, direct and reverse driven bevel gears independently rotatable upon said driven shaft and both being in geared relation respectively with said auxiliary shafts, means to connect and disconnect selectively each one of said driven bevel gears with said driven shaft, hydraulic couplers mounted upon each one of said auxiliary shafts, each of said hydraulic couplers having a pump rotor member and a turbine rotor member, said pump rotor members being independently rotatable with respect to the corresponding auxiliary shaft, bevel gears connecting said pump rotors with said driving shaft, and said turbine rotor members being fastened respectively on the corresponding auxiliary shaft.

5. A hydrodynamic transmission comprising a driving shaft, a driven shaft being in alignment with said driving shaft, auxiliary shafts positioned radially and forming respectively equal determined angle of incidence with said driving and driven shafts, direct and reverse driven bevel gears independently rotatable upon said driven shaft and both being in geared relation respectively with said auxiliary shafts, means to connect and disconnect selectively each one of said driven bevel gears with said driven shaft, hydraulic couplers mounted upon each one of said auxiliary shafts, each of said hydraulic couplers having a pump rotor member and a turbine rotor member, said pump rotor members being independently rotatable with respect to the corresponding auxiliary shaft, bevel gears connecting said pump rotors with said driving shaft, said turbine rotor members being fastened respectively on the corresponding auxiliary shaft, a coupler liquid substantially filling said hydraulic couplers, a series of cylindrical blades attached radially in said pump rotor members and having its interior cylindrical curvature in the same sense as the direction of rotation and its generatrix line being normal to the hydraulic joint plane between the pump and turbine rotor members, a series of cylindrical vanes attached radially in said turbine rotor members and having its interior cylindrical curvature in the inverse sense to the direction of rotation and its generatrix line being normal to the hydraulic joint plane between the pump and turbine rotor members, and means to exhaust the coupler liquid and inject cooled liquid alternatively in said hydraulic couplers.

BAUDILIO JESÚS PIQUÉ.

REFERENCES CITED

The following references are of record in the file of this patent:

UNITED STATES PATENTS

| Number | Name | Date |
|---|---|---|
| 2,063,471 | Stedefeld | Dec. 8, 1936 |
| 2,179,149 | Gruenberger | Nov. 7, 1939 |
| 2,260,015 | Fichtner | Oct. 21, 1941 |
| 2,468,107 | Powell | Apr. 26, 1949 |
| 2,535,904 | Davis | Dec. 26, 1950 |

FOREIGN PATENTS

| Number | Country | Date |
|---|---|---|
| 474,790 | Great Britain | Nov. 8, 1937 |
| 738,011 | France | Dec. 20, 1932 |